United States Patent
Bertetti et al.

[11] Patent Number: 6,076,896
[45] Date of Patent: Jun. 20, 2000

[54] WHEEL HUB OR HUB UNIT ALLOWING IMPROVED MOUNTING AND REMOVAL OF A BRAKE MEMBER

[75] Inventors: Paolo Bertetti, Turin; Andreas Rütter, Pinerolo, both of Italy

[73] Assignee: SKF Industrie S.P.A., Torino, Italy

[21] Appl. No.: 08/932,900

[22] Filed: Sep. 18, 1997

[30] Foreign Application Priority Data

Oct. 1, 1996 [IT] Italy ................................. TO96A0803

[51] Int. Cl.[7] .................................................. B60B 27/00
[52] U.S. Cl. ...................... 301/105.1; 301/6.8; 301/6.91; 188/18 A; 188/73.31
[58] Field of Search .................................... 301/6.1, 6.91, 301/6.8, 105.1; 188/218, 18 A, 73.31

[56] References Cited

U.S. PATENT DOCUMENTS

| | | |
|---|---|---|
| 1,665,437 | 4/1928 | Booth . |
| 1,816,643 | 7/1931 | Forsyth . |
| 2,022,041 | 11/1935 | Kliesrath . |
| 2,153,280 | 4/1939 | Shelor ................... 188/18 A |
| 2,893,519 | 7/1959 | Martin ................... 188/18 A |
| 2,905,279 | 9/1959 | Moyer ................... 188/18 A |
| 3,403,758 | 10/1968 | Stout ..................... 188/18 A |
| 3,583,511 | 6/1971 | Asberg . |
| 3,767,221 | 10/1973 | Asberg . |
| 3,884,331 | 5/1975 | Asberg . |
| 4,067,621 | 1/1978 | Reppert . |
| 4,270,805 | 6/1981 | Spisak . |
| 4,383,588 | 5/1983 | Krude . |
| 4,544,209 | 10/1985 | Braungart . |
| 4,550,809 | 11/1985 | Kawaguchi ............ 188/18 A |
| 4,596,312 | 6/1986 | Kawaguchi ............ 188/18 A |
| 4,621,700 | 11/1986 | Merkelbach . |
| 4,792,020 | 12/1988 | Okumura et al. . |
| 4,880,281 | 11/1989 | Merkelbach . |
| 4,913,266 | 4/1990 | Russell et al. ........... 188/218 XL |
| 5,366,279 | 11/1994 | Polka . |
| 5,590,967 | 1/1997 | Kapaan . |
| B1 4,282,952 | 10/1988 | Bartley .................. 188/18 A |

FOREIGN PATENT DOCUMENTS

| | | |
|---|---|---|
| 0 371 836 | 6/1990 | European Pat. Off. . |
| 0 680 836 | 11/1995 | European Pat. Off. . |
| 0 073 130 | 3/1996 | European Pat. Off. . |
| 2 723 886 | 3/1996 | France . |
| 1 189 877 | 3/1965 | Germany . |
| 26 35 608 | 2/1978 | Germany . |
| 29 19 411 | 11/1980 | Germany . |
| 39 00 356 | 7/1990 | Germany . |
| TO96A0387 | 5/1996 | Italy . |

Primary Examiner—S. Joseph Morano
Assistant Examiner—Long Bao Nguyen
Attorney, Agent, or Firm—Merchant & Gould P.C.

[57] ABSTRACT

There is disclosed a wheel hub or hub unit of the type having a radial hub flange (13) providing connection to the wheel (40) and to a brake member (10) having an annular disc portion having a plurality of ears (11) radially protruding from its inner edge. The hub flange (13) defines a plurality of axial passages, in the form of peripheral radial recesses (19) or bores (17, 17') for slipping a plurality of axial pins (30) to be fitted in holes (12) obtained in the brake member ears (11) and in openings (22) obtained in at least one radial wall (23) of a brake carrier (20) rotatably fast with the hub (14) to rotationally secure the brake member (10) to the hub. When the wheel (40) is mounted on the outside of the hub flange, axial movement of the pins towards the outside is stopped by the wheel.

18 Claims, 13 Drawing Sheets

WHEEL HUB OR HUB UNIT ALLOWING IMPROVED MOUNTING AND REMOVAL OF A BRAKE MEMBER

DESCRIPTION

1. Field of the Invention

The present invention generally relates to wheel hubs or hub units having a disc or drum brake member comprising an annular disc the inner edge of which forms a plurality of radial ears. More particularly, the invention refers to a wheel hub or hub unit allowing to mount and remove a brake member of the said kind from the outside of the vehicle onto a brake carrier which is located on the inner side of the hub flange. The invention pertains to the mounting and securing of the brake disc on the brake carrier.

2. Background of the Invention

Known motor vehicle wheel hubs form a radial flange for connecting to the wheel and the brake member, disc or drum. In conventional designs, as can be seen in FIG. 1A, the brake disc or drum is mounted on a hub or hub bearing unit by centring on a spigot diameter on the outside of the hub flange and being secured by a threaded coupling means and finally fixed by the wheel bolts or nuts.

These prior art solutions have an inconvenience in that the tightening of the wheel bolts causes distortion of the brake disc. Also, under the influence of temperature variation, the braking surface is adversely affected by distortion due to the aforecited securing arrangement.

Accordingly, it is a primary object of the present invention to provide an easy system for securing the brake member to the brake carrier and hub in such manner that the brake member is free to deform due to temperature variation which it undergoes without transmitting stresses or distortion to those members to which it is secured or near.

It is a further object of the invention to provide a system wherein the brake member does not suffer distortion when the wheel bolts are tightened.

It is another object of the present invention to provide a hub or hub bearing unit which allows to assemble and remove a brake member as set forth in a simple way and from the outside of the car on the inner side of the hub flange on a brake carrier that again is connected to the hub flange itself, and therefore eliminate the above discussed drawbacks of conventional ways of centring and clamping of the wheel.

It is another object of the present invention to provide a wheel hub unit providing improved ventilation and thermal dispersion of the heat generated during braking.

A still further object of this invention is to improve fixing of the brake disc to the brake carrier from the outer side.

SUMMARY OF THE INVENTION

In accordance with the present invention, the above and other objects are achieved by a wheel hub or hub unit of the type having a radial hub flange providing connection to the wheel and to a brake member comprised of an annular disc portion having a plurality of ears radially protruding from its inner edge. The hub unit is characterised In that said hub flange defines a plurality of axial passages, in the form of peripheral radial recesses or bores for slipping a plurality of axial pins to be fitted in holes obtained in said brake member ears and in openings obtained in at least one radial wall of a brake carrier rotatably fast with the hub to rotationally secure the brake member to the hub. Owing to this arrangement, when the wheel is mounted on the outside of the hub flange, axial movement of said pins towards the outside is stopped by the wheel itself.

Preferably, said hub flange has a substantially star-shaped outer contour defined by an alternate succession of radial appendixes and recesses being angularly equally spaced at the same angular pitch as said radially protruding inner ears of the brake member. The inner edge of the brake member and the outer contour of said hub flange are so shaped as to allow for the brake member to be inserted over the hub flange from the outside of the vehicle.

BRIEF DESCRIPTION OF THE DRAWINGS

The above and other objects, advantages and features of the present invention will become readily apparent to those skilled in the art from a study of the following description of various exemplary preferred embodiments when read in conjunction with the attached drawings and appended claims.

DESCRIPTION OF PREFERRED EMBODIMENT

Figure 1:
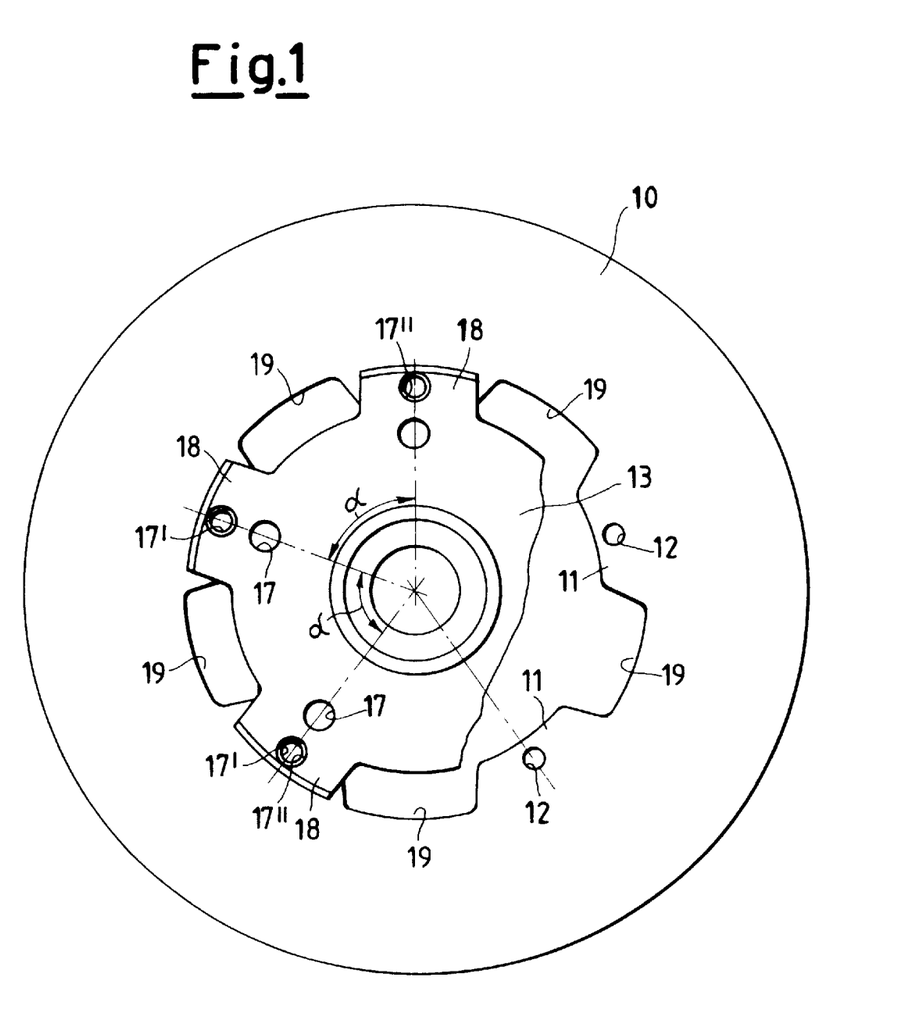
FIG. 1 is a schematic front view of a brake member and a hub unit according to the present invention.
Figure 1A:
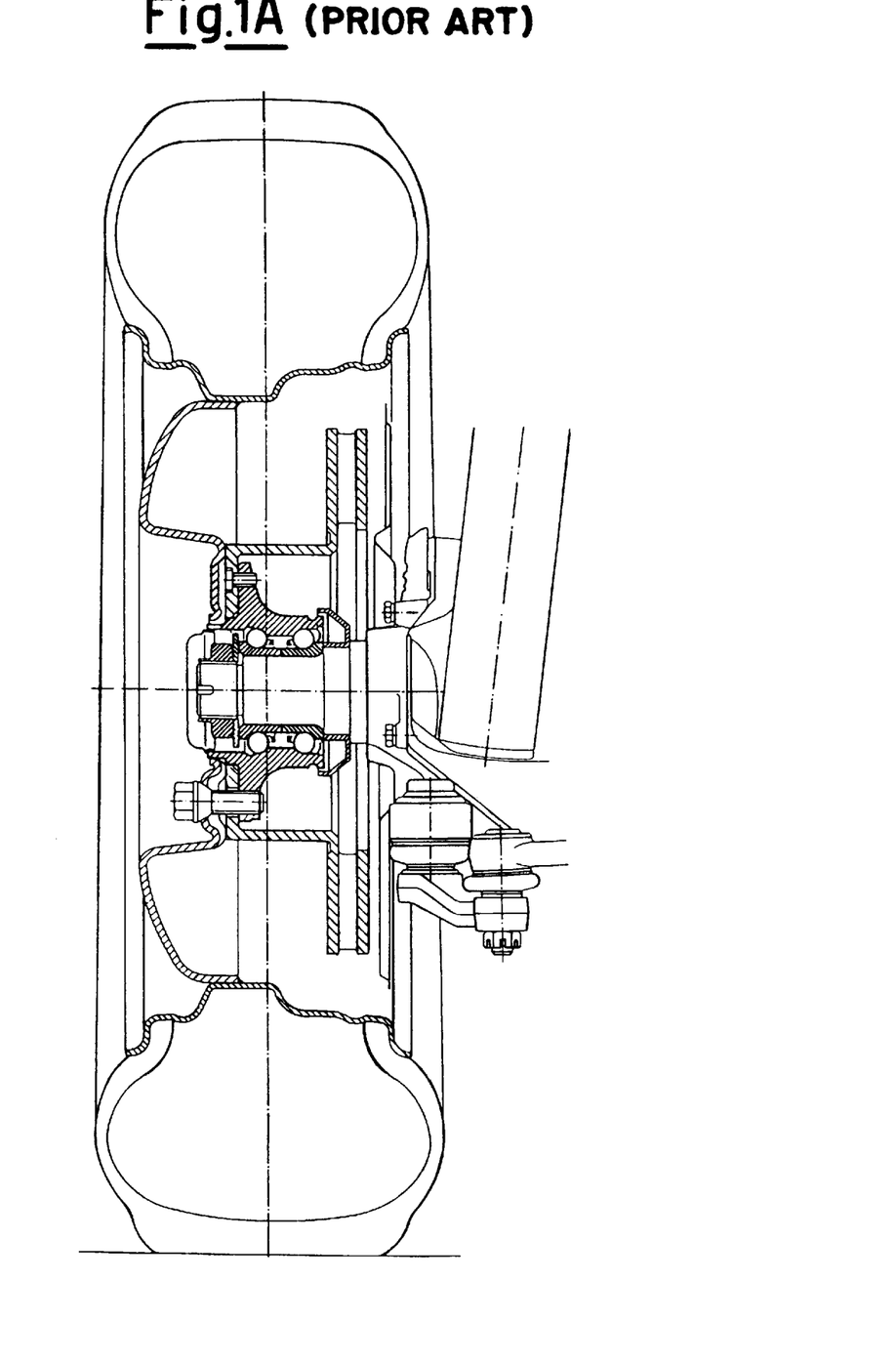
FIG. 1A is an axial cross sectional view of a conventional way of fixing the brake member to a wheel hub.
Figure 2:
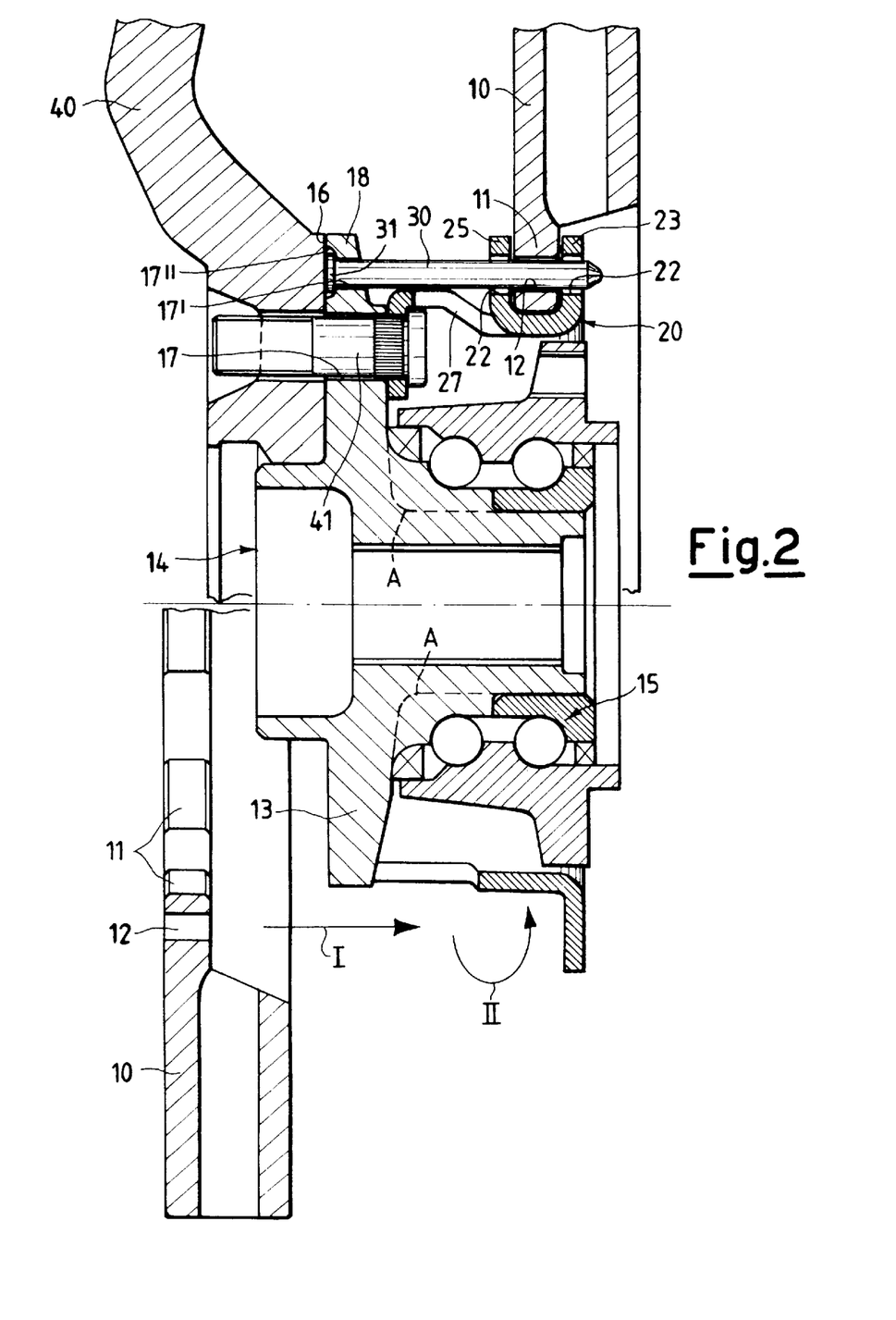
FIG. 2 is an axial cross sectional view showing schematically a first embodiment of the hub unit of FIG. 1.

Referring initially to FIG. 1, numeral 10 designates overall a brake member, in this instance a brake disc, of known kind consisting of an annular disc. The inner edge of the disc forms a plurality of radial ears 11 angularly equally spaced with an angular pitch α. The radial ears 11 protrude towards the central axis of rotation of the hub unit. A through hole 12 is provided in each ear 11 for fixing to a radial rotating flange 13 of the wheel hub 14, as shown in FIG. 2. In the various embodiments described and shown in the following, the hub 14 also forms on of the two inner races of the hub bearing (designated overall at 15), but it is understood that the present invention is equally applicable to solutions wherein both of the inner races are formed by separate rings, as indicated schematically by phantom line A in FIG. 2.

Still referring to FIG. 2, as disclosed in Italian Patent application No. IT-TO96A000387 to the same Applicant, an intermediate connecting member 20 of annular shape supporting the brake member 10 is fixed to the rotating hub flange 13.

According to an aspect of the present invention, hub flange 13 has a substantially star-shaped outer contour defined by an alternate succession of radial appendixes 18 and recesses 19 which are angularly equally spaced at the same angular pitch a as the inner ears 11 of brake member 10. As apparent from FIG. 1, the outer contour of hub flange 13 is so shaped and dimensioned as to allow for the brake member 10 to be inserted over the hub flange 13 when the hub is already mounted to the vehicle (not shown for simplicity) without interfering with the radial appendixes 18 nor with a plurality of radial ears 25, described in more detail hereinafter, obtained by folding radially some portions of an intermediate connecting member (or brake carrier) 20 of annular shape carrying the brake member.

As indicated schematically by arrow I and II in FIG. 2, the brake disc (or drum brake) 10 is firstly pushed axially from the outside to the inside of the vehicle (arrow I) until it abuts against radial wall 23 of the brake carrier 20. Secondly, brake member 10 is rotated half angular pitch (α/2) as indicated by arrow II so as to axially align the brake member through holes 12 with corresponding openings 22 obtained in the brake carrier 20. Then, a plurality of axial pins 30, preferably metal, are slipped through special bores 17' obtained in the hub flange 13 and inserted in the aligned holes 12 and openings 22, rotationally securing the brake member 10 to the hub 14.

As shown in FIG. 2, the pins 30 have an abutment means, in form of a thicker head portion 31, abutting the axially outer surface of hub flange 13. In a preferred embodiment, as shown in FIG. 2, a plurality of notches 17" is provided at the opening of holes 17' for seating the thicker heads 31 such that the axially outer ends of the pins are flush with the external surface 16 of hub flange 13 when the wheel 40 is assembled.

The wheel 40 is then mounted to the flange hub 13 in removable manner by studs 41 and nuts or wheel bolts. Tightening of the nuts or wheel bolts locks the wheel against the hub, preventing pins 30 from slipping axially towards the outside from the aligned bores 12 and openings 22. The purpose of the thicker portion 31 is to prevent the pins from slipping out towards the inside of the vehicle.

Figure 3:
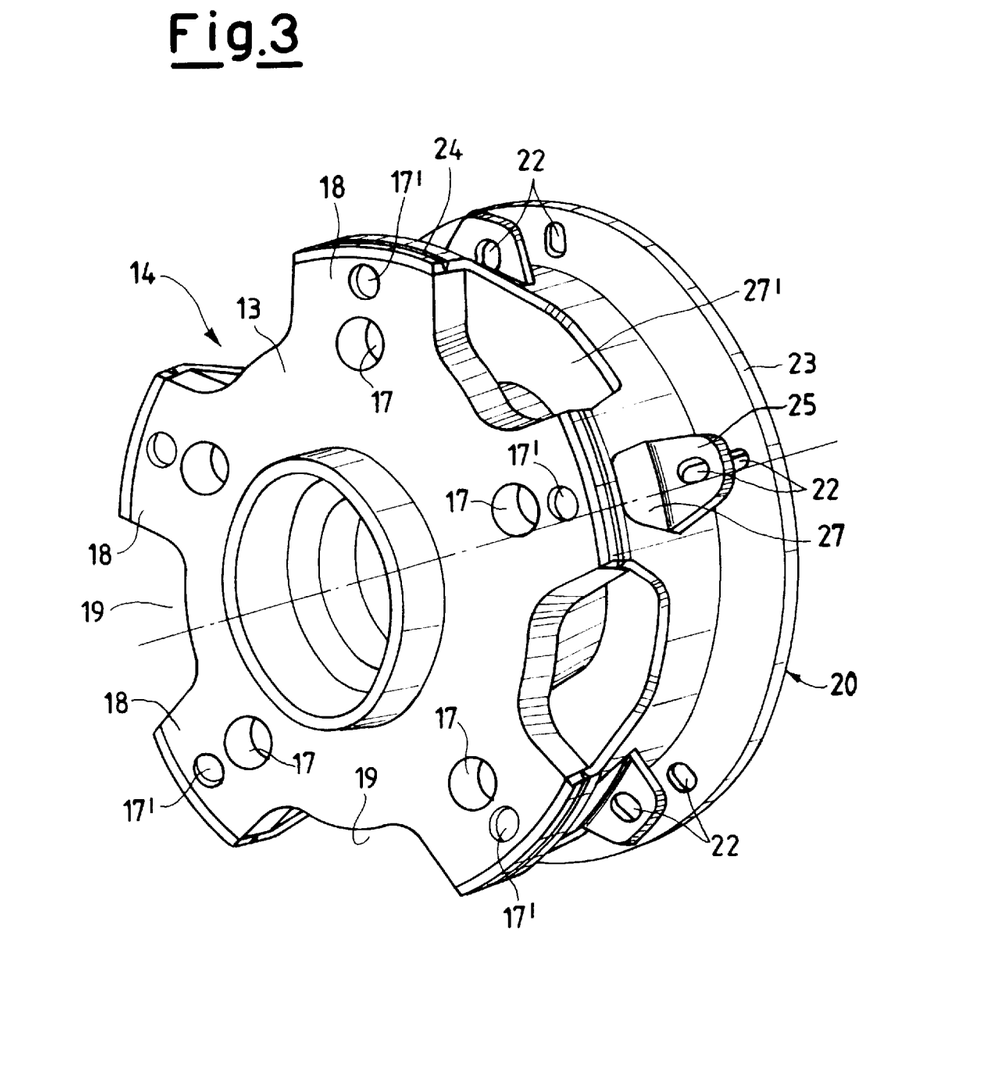
FIGS. 3 and 4 are two perspective views schematically showing two alternative embodiments of a hub unit of this invention, respectively.

With reference to FIGS. 2 and 3, to accommodate the pins 30 in the brake carrier 20 said openings 22 are provided both in the axially innermost wall or flange 23 and in the radial ears 25 axially aligned with the openings of said wall 23, so as to provide for each pin 30 two points contrasting mutual rotation of the brake member relative to the hub on either side of the brake ears 11.

Figure 6:
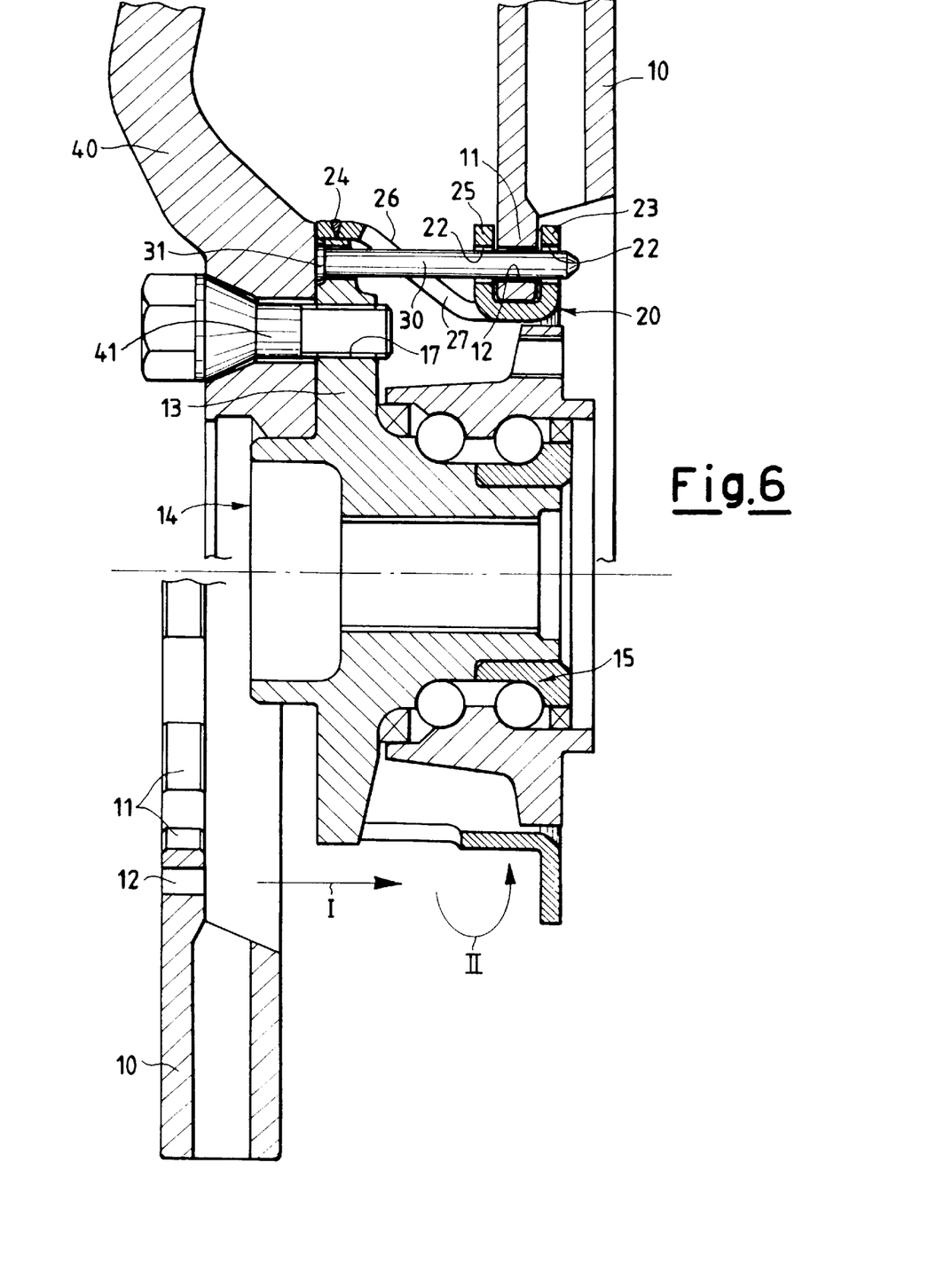

FIG. 6 is an axial cross-sectional view showing an alternative embodiment wherein the brake carrier 20 is welded at 24 to the edge of radial appendixes 18 of the hub flange 13.

Still in accordance with the present invention, the openings 22 are radially elongate as slots so as to let the brake member 10 free to expand and contract under the effect of thermal variation which it is subjected to in operation, without transmitting stress to the other members of the hub/bearing unit. This is extremely advantageous in that it eliminates any distortion of the brake disc due to thermal variation in service and tightening of the bolts upon clamping the wheel. Additionally, the slot openings 22 are arranged in a radiating pattern relative to the axis of rotation such that the brake member 10 always remains perfectly centred also when it is thermally expanded. Preferably, the brake carrier ears 25 are axially spaced from the wall 23 so as to accommodate the brake member 10 with some axial clearance to let it be free to expand thermally in the axial direction without yielding the members which it is secured to.

The ears 25 are obtained by folding radially parts of a substantially cylindrical or slightly conical portion 26 of the brake carrier 20, defining apertures 27 which facilitate ventilation and dispersion of heat generated at the brakes during braking. In the example of FIG. 3, the brake carrier radial ears 25 are axially aligned with the radial appendixes of hub flange 13. In order to further enhance ventilation, further ventilation apertures 27' are provided between the first apertures 27. The further apertures 27' are offset with respect to the radial appendixes 18.

Figure 4:
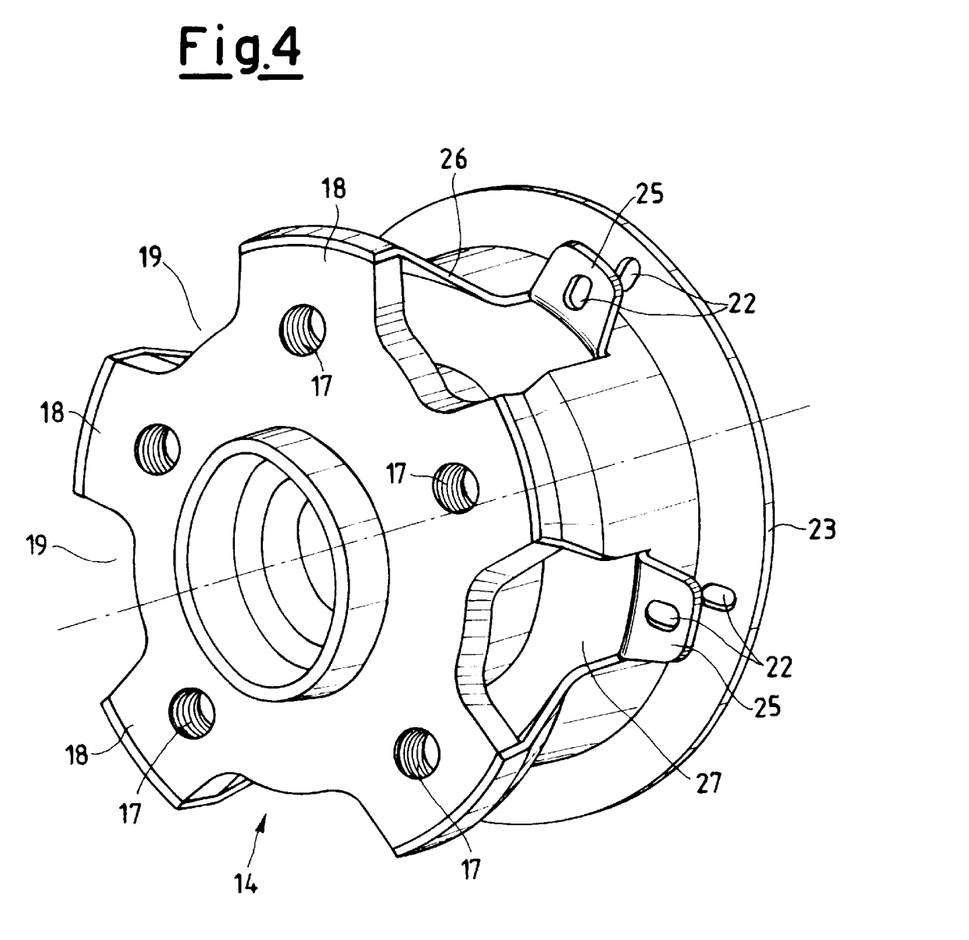
Figure 5:
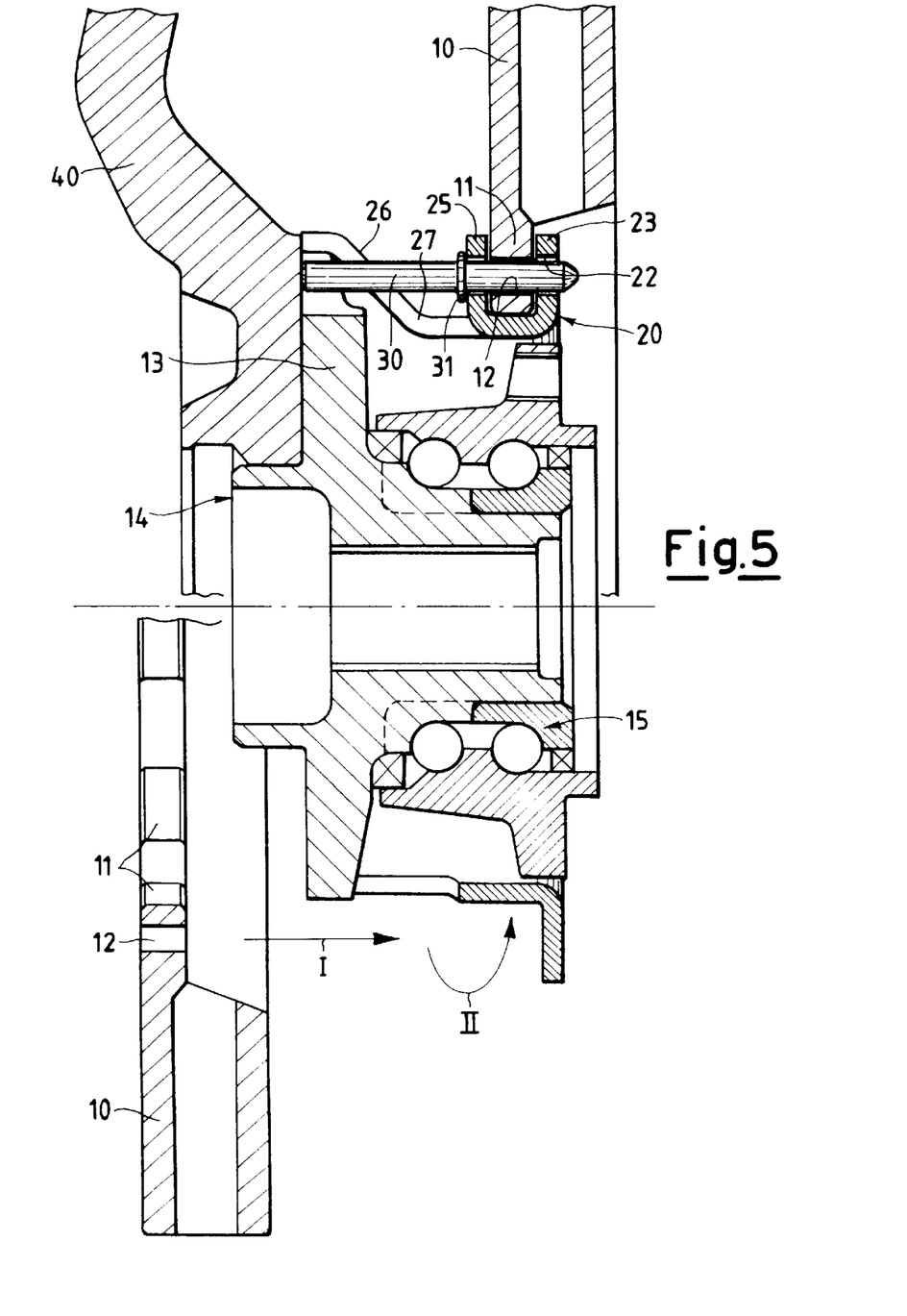
FIGS. 5, 6 and 7 are schematic axial cross sectional views depicting further variants of the hub unit.

In the example of FIG. 4, the radial ears 25 are offset between the radial appendixes 18. In this case, it is not necessary to drill special bores (17') in the flange, as the pins 30 can be inserted through the ventilation apertures 27 between two consecutive radial appendixes 18. As shown in FIG. 5, along the pins 30 there are provided abutment means in the form of thicker portions 31 axially abutting the ears 25 to stop the pins from sliding towards the inside of the vehicle. The outer end of each pin is stopped by the wheel 40. The abutment means 31 may be thicker portions 31 obtained as a whole with the pins or consist of separate stopping rings forcefully fitted along the pins or separate seeger rings snapped on the pins.

Figure 7:
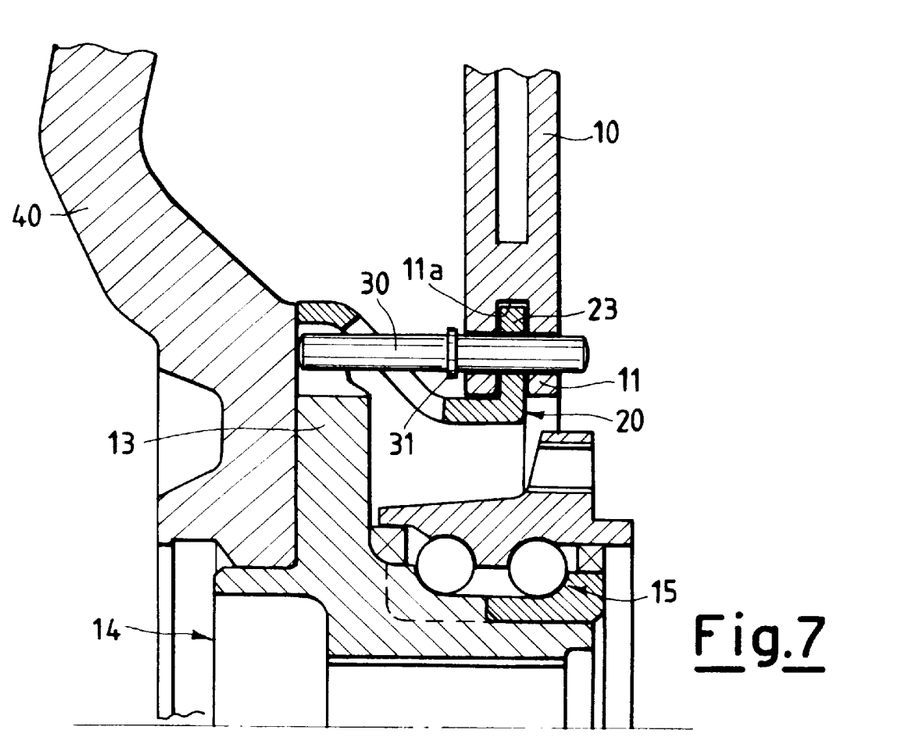

In FIG. 7 there is shown a further variant wherein the brake-carrier wall 23 is inserted in peripheral slits 11a obtained in the brake member ears 11.

Figure 8:
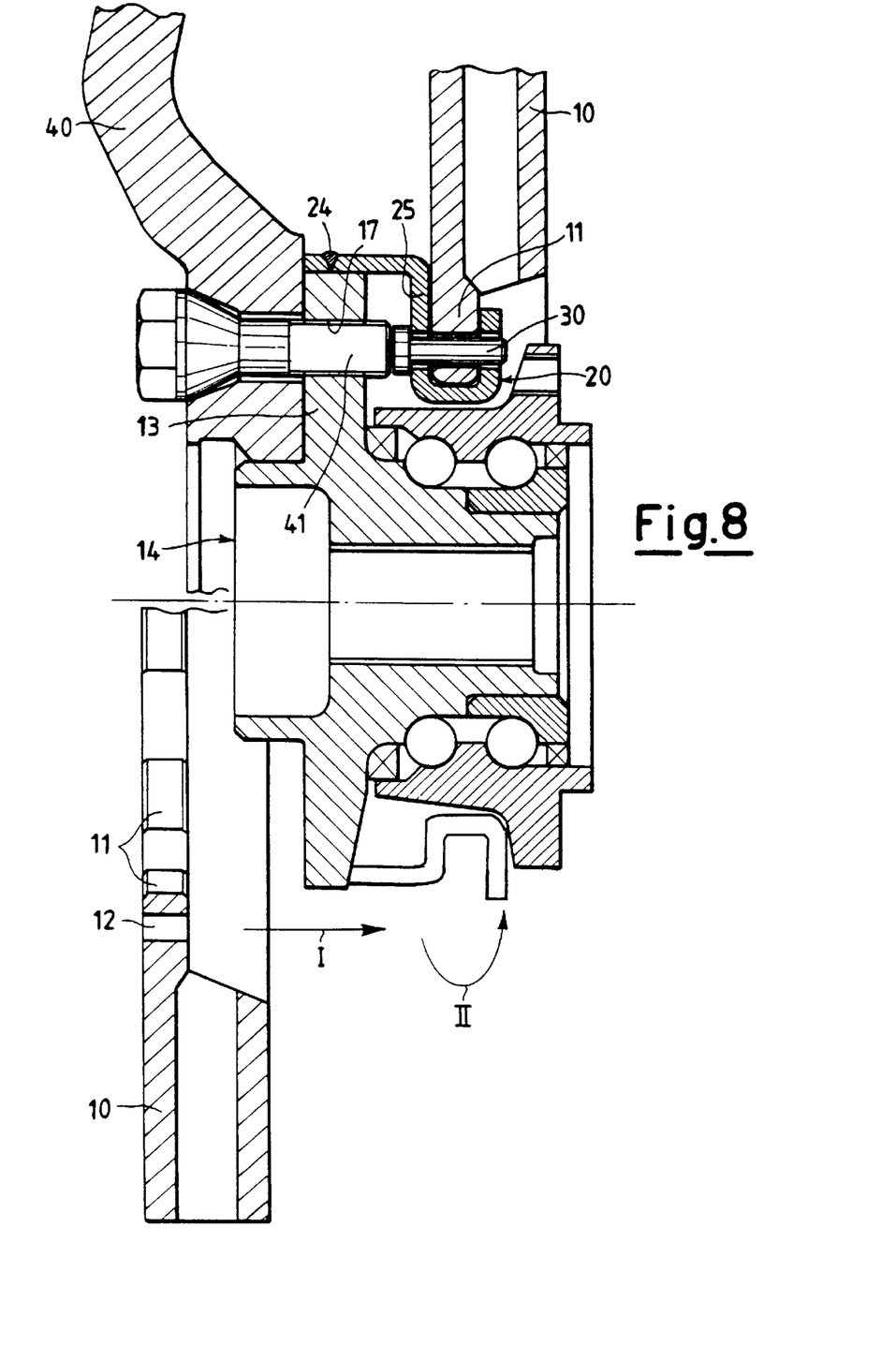
FIGS. 8 and 9 are an axial cross sectional view and a perspective view, respectively, of a still further variant of this invention.
Figure 9:
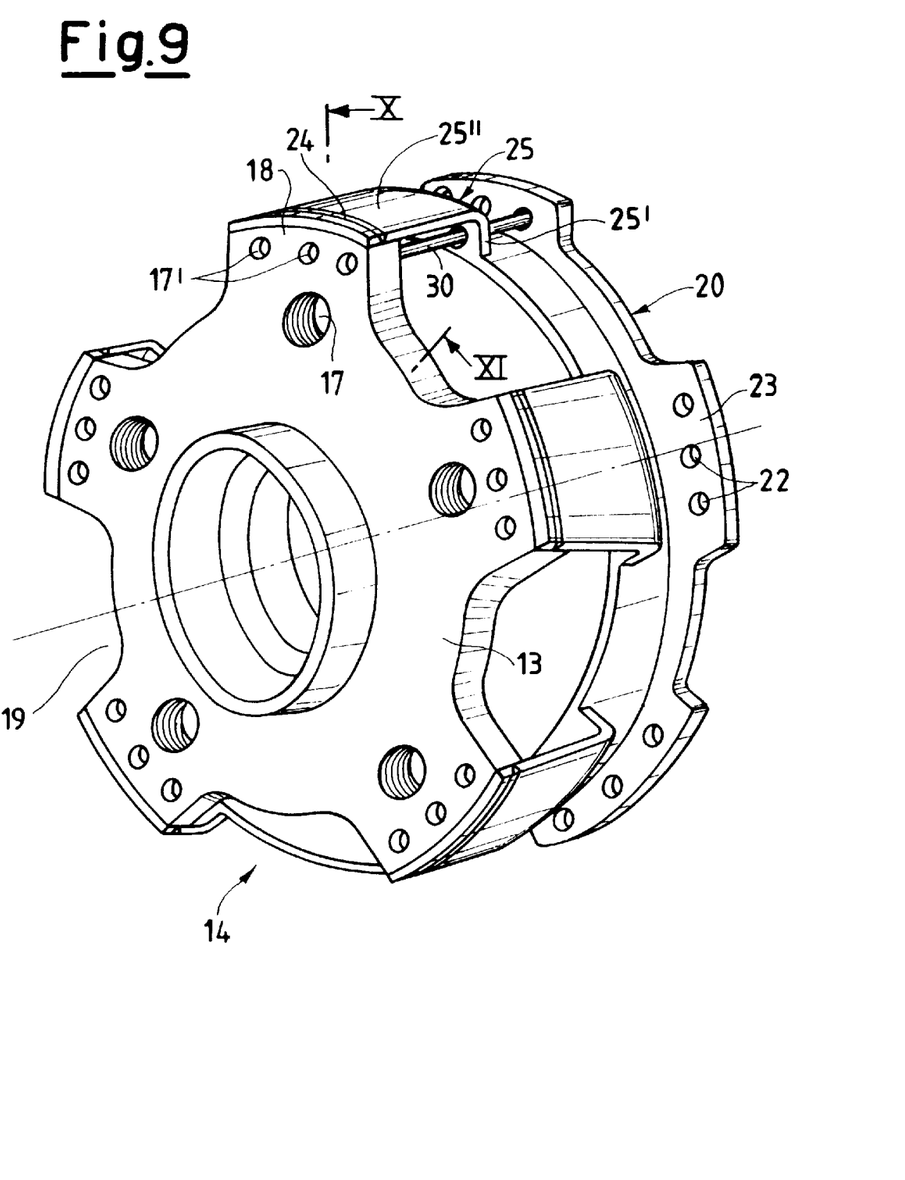
Figure 10:
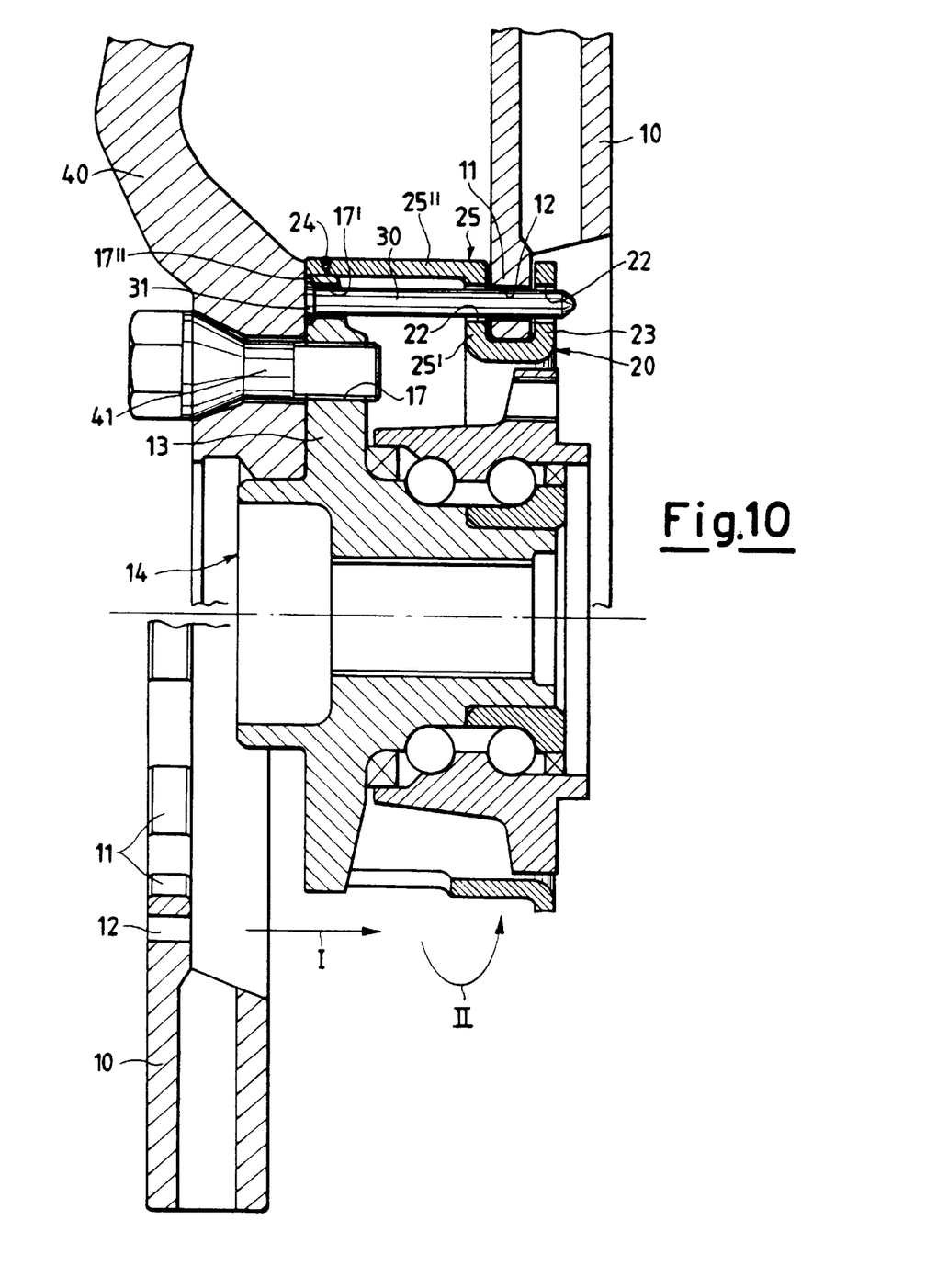
FIGS. 10 and 11 are cross sectional views as seen in the directions of arrows X and XI, respectively, in FIG. 9.
Figure 11:
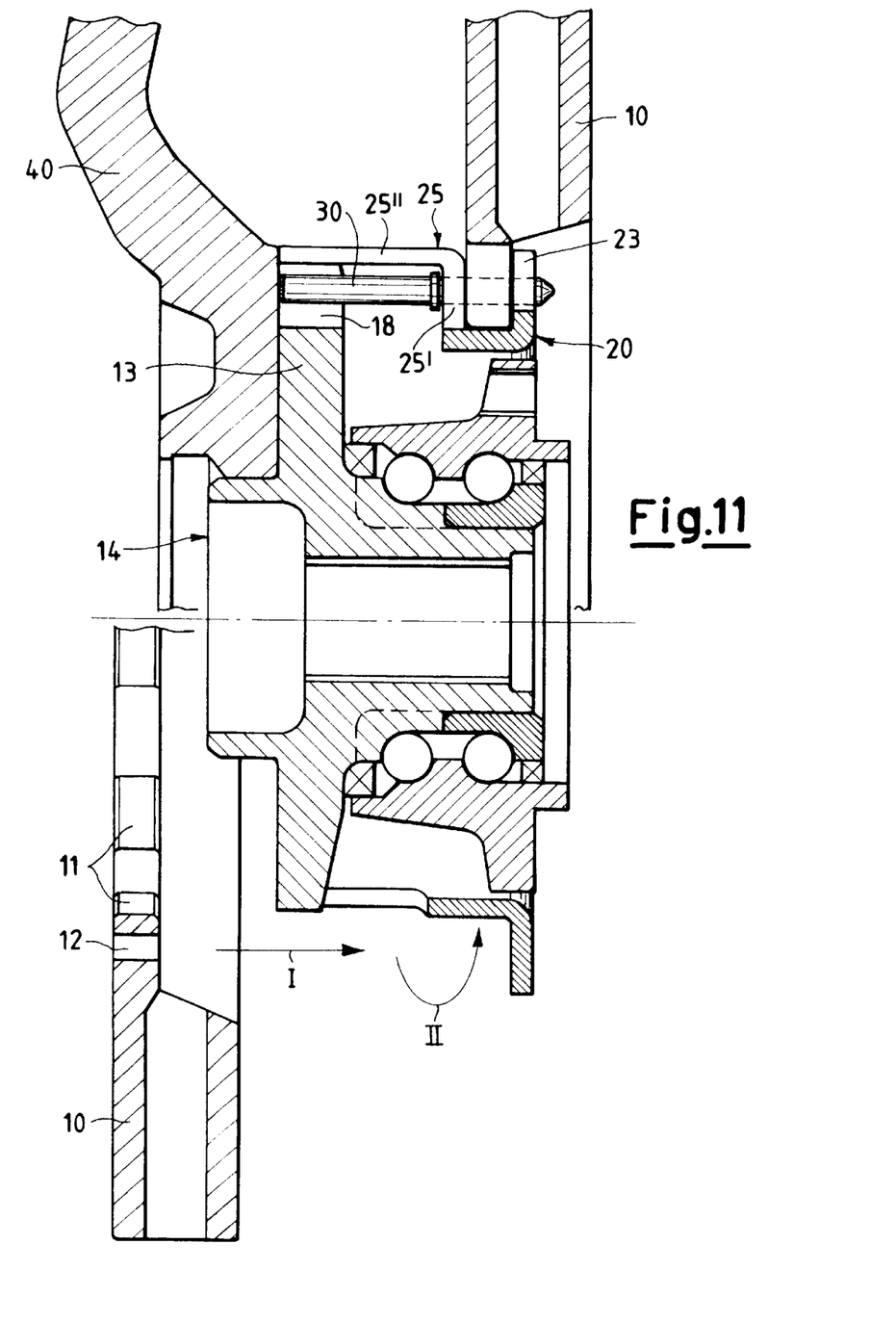

In a still different embodiment, shown in FIG. 8, axial movement of pins 30 is prevented by the same ends of the wheel bolts 41. In this case, no bores (17') have to be specially obtained in the flange to slip the pins 30 through. Instead, they are inserted through the same wheel bolt bores 17 before fitting the bolts.

In FIGS. 8 to 11, a still further embodiment is shown wherein the ears 25 are bent in L-shape forming a first radial length 25' and a second axial length 25" the end of which is welded to the edge of the radial appendix of hub flange 13.

Figure 12:
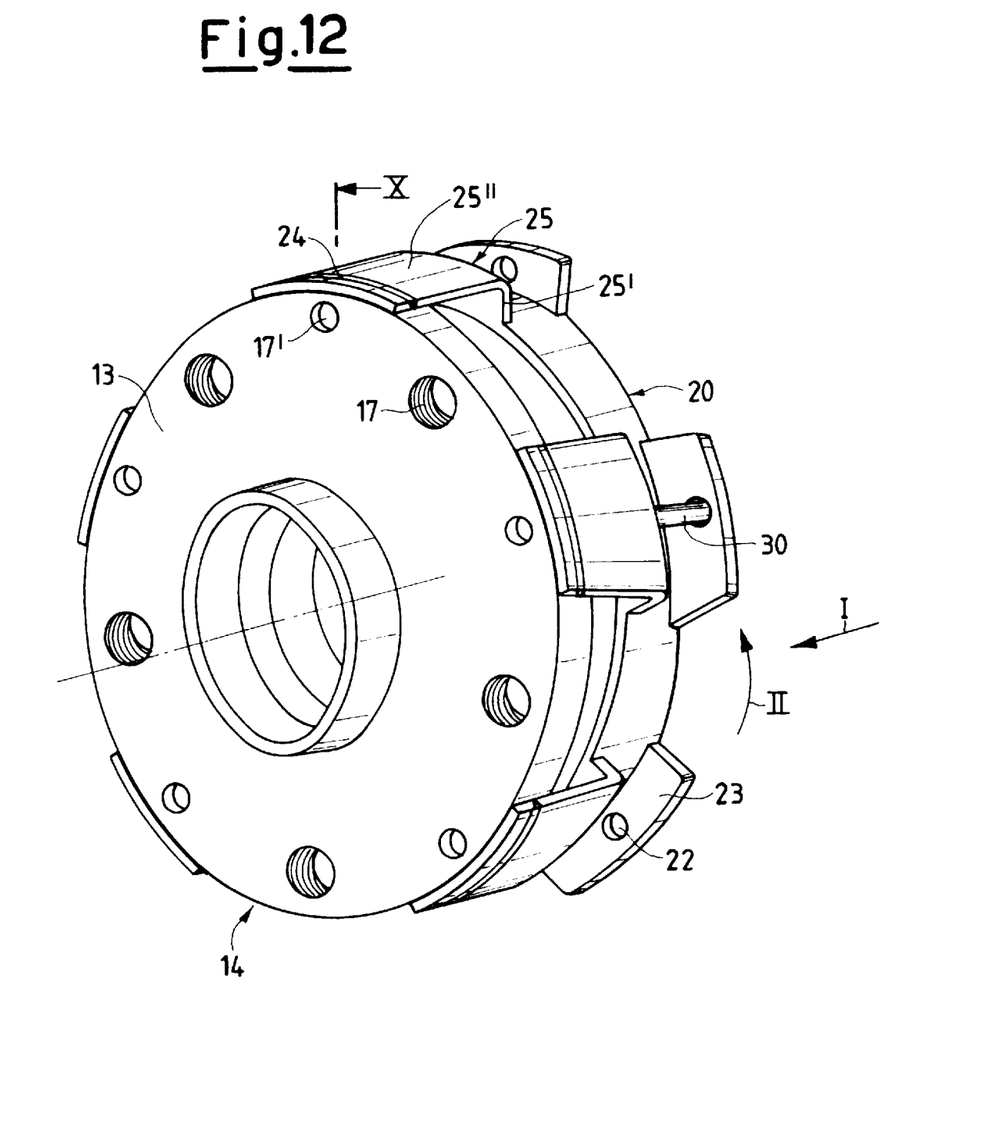
FIG. 12 is a perspective view of a further variant.

In the further variant of FIG. 12, the hub flange 13 is circular and has peripheral bores 17' be specially obtained to slip the pins 30 through it.

It will be appreciated that the wheel hub unit of this invention allows to mount and remove the brake member from the outside of the vehicle onto the brake carrier located on the inner side of the hub flange. Also, the brake member can be easily mounted onto and removed from the hub from the outside of the vehicle without having to take the hub flange off. Furthermore, the brake member is mounted to the hub in floating manner and is free to deform thermally in either radial and axial direction without being distorted nor causing distortion to any of the parts to which it is attached or near. In addition, there is no influence on the brake member causes by possible distortion of the bearing/hub flange during the clamping of a non-planar wheel.

There have been described hereinabove several exemplary preferred embodiments of the hub unit according to the principles of the present invention. Those skilled in the art may now make numerous uses of, and departures from, the above described embodiments without departing from the inventive concepts disclosed herein. Accordingly, the present invention is to be defined solely by the scope of the following claims.

What is claimed is:

1. A wheel hub having a radial hub flange providing connection to the wheel and to a brake member comprised of an annular disc portion having a plurality of ears radially protruding from the inner edge of the disc portion, wherein said hub flange defines a plurality of axial passages, in the form of peripheral radial recesses for slipping a plurality of axial pins to be fitted in holes obtained in said brake member ears and in openings obtained in at least one radial wall of a brake carrier integral for rotation with the hub to rotationally secure the brake member to the hub, whereby when the wheel is mounted on the outside of said hub flange, axial movement of said pins toward the outside is stopped by the wheel.

2. The wheel hub unit of claim 1, wherein said hub flange has a substantially star-shaped outer contour defined by an alternate succession of radial appendixes and recesses being angularly equally spaced at the same angular pitch ($\alpha$) as said radially protruding inner ears of the brake member; the inner edge of the brake member and the outer contour of said hub flange being shaped to allow for the brake member (10) to be inserted over the hub flange from the outside of a vehicle.

3. The wheel hub unit of claim 1, wherein the pins have an abutment means for abutting a wall integral for rotation with the hub to prevent the pins from slipping towards the inside of a vehicle.

4. The wheel hub unit of claim 3, wherein said abutment means comprise thicker portions at the head of the pins for abutting against the axially outer surface of said hub flange.

5. The wheel hub unit of claim 3, wherein said abutment means are disposed along the length of the pins to abut against said brake-carrier.

6. The wheel hub unit of claim 5, wherein said abutment means is a separate seeger ring snapped on the pins.

7. The wheel hub unit of claim 1, wherein to accommodate said pins in the brake-carrier said openings are provided both in said radial wall and in a plurality of radial brake-carrier ears axially aligned with said openings of said wall.

8. The wheel hub unit of claim 1, wherein said openings are radially elongate and arranged in a radiating pattern relative to the hub rotation axis.

9. The wheel hub unit of claim 1, wherein said hub flange comprises wheel bolt bores axially aligned with said openings and said holes.

10. The wheel hub unit of claim 1, wherein said brake-carrier radial wall is inserted in peripheral slits present in said brake member ears.

11. The wheel hub unit of claim 1, wherein said brake carrier has a plurality of apertures providing ventilation for the brake member.

12. The wheel hub unit of claim 1, wherein said brake carrier radial ears are obtained by folding radially parts of a substantially cylindrical of said brake carrier, whereby said ventilating apertures are defined.

13. The wheel hub unit of claim 1, wherein said brake carrier ears are axially spaced from said radial wall to accommodate the brake member with axial clearance to let the brake member free to expand thermally in the axial direction without releasing the brake member from the wheel hub unit.

14. The wheel hub unit of claim 1, wherein the hub forms one of the races of a bearing unit.

15. The wheel hub unit of claim 7, wherein said brake carrier radial ears are bent in L-shape forming a first radial length and a second axial length the end of which is welded to the edge of said radial appendix.

16. The wheel hub unit of claim 1, wherein the hub forms one of the races of a bearing unit.

17. The wheel hub unit of claim 5, wherein said abutment means is a separate ring pushed on the pins.

18. The wheel hub unit of claim 1, wherein said brake carrier radial ears are obtained by folding radially parts of a slightly conical portion of said brake carrier, whereby said ventilating apertures are defined.

* * * * *